(12) United States Patent
Ding et al.

(10) Patent No.: US 11,017,198 B2
(45) Date of Patent: May 25, 2021

(54) SLAP SEGMENTATION OF CONTACTLESS FINGERPRINT IMAGES

(71) Applicant: GEMALTO COGENT INC, Pasadena, CA (US)

(72) Inventors: Yi Ding, Pasadena, CA (US); Anne Jinsong Wang, Pasadena, CA (US); Songtao Lester Li, Pasadena, CA (US)

(73) Assignee: GEMALTO COGENT INC, Pasadena, CA (US)

( * ) Notice: Subject to any disclaimer, the term of this patent is extended or adjusted under 35 U.S.C. 154(b) by 37 days.

(21) Appl. No.: 16/458,955

(22) Filed: Jul. 1, 2019

(65) Prior Publication Data
US 2021/0004560 A1    Jan. 7, 2021

(51) Int. Cl.
*G06K 9/00* (2006.01)
*G06K 9/20* (2006.01)
*G06K 9/46* (2006.01)

(52) U.S. Cl.
CPC ....... *G06K 9/00033* (2013.01); *G06K 9/2027* (2013.01); *G06K 9/4604* (2013.01)

(58) Field of Classification Search
CPC ............. G06K 9/00033; G06K 9/2027; G06K 9/4604; G06K 9/00006–0012
See application file for complete search history.

(56) References Cited

U.S. PATENT DOCUMENTS

| | | | |
|---|---|---|---|
| 2008/0298648 A1* | 12/2008 | Lo ...................... | G06K 9/00067 382/125 |
| 2011/0157346 A1* | 6/2011 | Zyzdryn ............ | G06K 9/00067 348/77 |
| 2012/0086794 A1* | 4/2012 | Burcham ............... | G06K 9/036 348/77 |
| 2016/0232401 A1* | 8/2016 | Hoyos ................ | G06K 9/00107 |
| 2019/0180133 A1* | 6/2019 | Shannon ................... | G06T 7/11 |

* cited by examiner

*Primary Examiner* — Stephen G Sherman
(74) *Attorney, Agent, or Firm* — The Jansson Firm; Pehr B. Jansson

(57) ABSTRACT

The present invention relates to a method to segment slap images and to generate accurately labelled individual fingerprints, said method comprising the following steps:
reception of inputs images from a contactless fingerprint reader under controlled lighting conditions;
computation of a variance in the received images to estimate a slap area as a foreground slap mask in the input images;
identification of individual fingers by finding boundary of each finger;
verification of a number of fingers and of geometric constraints;
calculation of pose and orientation based on shape and geometry information;
identification of effective fingertip area on each detected finger according the pose, orientation, as well as geometric information;
output of individual fingerprints.

7 Claims, 4 Drawing Sheets

SLAP SEGMENTATION OF CONTACTLESS FINGERPRINT IMAGES

FIELD OF THE INVENTION

The present invention relates to a method and an apparatus of the slap segmentation for contactless fingerprint images.

BACKGROUND OF THE INVENTION

More specifically, contactless fingerprint images are captured by contactless fingerprint readers. Contactless fingerprint readers are emerging in recent years. Unlike the traditional livescan fingerprint readers that only take the fingerprints touching the device, the contactless fingerprint readers capture the photos of all the fingers/slaps/palms presented to the device. In order to identify the location and the effective region of each individual fingerprint, the captured slap images need to be automatically segmented.

Biometric data such as fingerprint is playing more and more important roles in the area of data security, border control, law enforcement, financial, health care, and etc. On the Automatic Fingerprint Identification System (AFIS), the identification relies on the unique patterns of fingerprints, i.e., ridges and valleys on the surface of fingertips. Conventional fingerprint images are either obtained from the inked impressions on ten-print cards, or captured by touch-based fingerprint capture devices like optical readers and capacitive readers. In recent years, with the increasing demands for faster fingerprint acquisition, enrollment, and matching, contactless fingerprint readers have been developed by which fingerprint images can be conveniently captured without any physical contact between the subjects' fingers and the device. In spite of modality changes, both contact and contactless fingerprint acquisitions share one critical step: how to accurately segment desired individual fingerprints out from the captured images, especially from the slap images that refer to multiple flat fingerprints captured simultaneously, typically by placing left/right slaps of four fingers, i.e. index, middle, ring, little, or two-thumb on the inked cards or fingerprint readers.

Considering the nature of the inked cards and contact fingerprint readers, the traditional contact slap segmentation approaches mainly employ shape, texture, orientation, and geometric constraints to identify each fingerprint.

Such method to segment contact fingerprint images are found in the following documents: U.S. Pat. No. 7,072,496 B2, Craig I. Watson, "Slap Fingerprint Segmentation Evaluation II-Procedures and Results". NIST Interagency/Internal Report (NISTIR)-7553, 2009, Brad Ulery, et al., "Slap Fingerprint Segmentation Evaluation 2004 Analysis Report". NIST Interagency/Internal Report (NISTIR)-7209, 2005, Sklansky, J., "Finding the Convex Hull of a Simple Polygon". Pattern Recognition Letters, Vol 1 Issue 2, pp 79-83, 1982, Christian Wolf, et al. "Text Localization, Enhancement and Binarization in Multimedia Documents". International Conference on Pattern Recognition, volume 4, pages 1037-1040, 2002, Yong-Liang Zhang, Gang Xiao, Yan-Miao Li, Hong-Tao Wu, and Ya-Ping Huang. 2010. Slap Fingerprint Segmentation for Live-Scan Devices and Ten-Print Cards. In Proceedings of the 2010 20th International Conference on Pattern Recognition (ICPR '10).

The contactless fingerprint readers capture slap images through a high-resolution camera without any touching with the subject in an open space, which is much faster and more convenient but make the conventional slap segmentation algorithms for contact fingerprint images fail in many cases due to the modality change of the subjects.

Indeed, it is very common that fingers in slap images from contactless reader are not clearly separated from each other. It is the most challenging scenario for traditional slap segmentation algorithms on touch-based devices that are developed with strong assumptions that fingerprints from different fingers are well separated from each other.

Also, with or without guidance, the slap, subjects to be imaged, might be placed over the device with various poses, so that the appearance, like rotation, direction, and location, of the slaps in captured images may change dramatically.

At last, compared with the touch-based slap images, the contactless ones capture the whole slap, which is problematic for traditional methods that rely on the texture information because the upper palm may show similar patterns as fingerprints.

Therefore, it is desirable to design a new method and apparatus to accurately identify and segment each individual fingerprint from the slap images captured by a contactless fingerprint reader, which is expected to be adaptive to various hand shape, hand poses, and distance of the subjects.

Further alternative and advantageous solutions would, accordingly, be desirable in the art.

SUMMARY OF THE INVENTION

The present invention aims at proposing a segmentation method applicable to contactless acquired slap images.

The present invention is defined, in its broadest sense, as a method to segment slap images and to generate accurately labelled individual fingerprints, said method comprising the following steps:

reception of inputs images from a contactless fingerprint reader under controlled lighting conditions;

computation of a variance in the received images to estimate a slap area as a foreground slap mask in the input images;

identification of individual fingers by finding boundary of each finger;

verification of a number of fingers and of geometric constraints;

calculation of pose and orientation based on shape and geometry information;

identification of effective fingertip area on each detected finger according the pose, orientation, as well as geometric information;

output of individual fingerprints.

This invention is a unique and efficient solution that combines both hardware and software capabilities of the contactless fingerprint identification systems. It only needs two images to compute a variance and a minimum hardware setup to solve the problem.

Advantageously, in terms of hardware, the images acquired under controlled lighting conditions are images acquired with and without flash light.

The software part of the method then receives two slap images for the same subject, one is with the flash light on, the other one is with the flash light off, then the apparatus is able to transmit, process, and save the captured images and processed individual fingerprint images. In terms of the software, the proposed algorithms are able to adaptively estimate the position of each individual fingerprint, then generate the location information of them.

According to an advantageous embodiment, the individual finger identification step comprises an adaptive binarization sub step applied to an original lighted image with the foreground slap mask by calculating the dynamic range of both global and local dynamics according to the equation Thres(x,y)=α(x,y)+pα(x,y)(β(x,y)−q), where α(x,y) is a local dynamic factor, β(x,y) is a global dynamic factor and p,q are pre-defined parameters, this adaptive binarization sub step outputting individual finger's masks.

The use of such an adaptive threshold enables to automate the detection of the individual finger.

According to an advantageous feature of the invention, the step of calculation of pose and orientation based on shape and geometry information comprises a convexity check to detect fingertip points of the fingers.

This is a simple way to determine the orientation of the slap.

According to a preferred embodiment of the invention, the step of calculation of pose and orientation based on shape and geometry information comprises a sub step of defining a center line of each individual finger mask, a sub step of calculating gradients along the direction of the finger centerline on the finger image, a sub step of detection of a first finger joint by finding perpendicular line with maximum gradient within certain distance to a fingertip point, a fingertip mask being defined by the area extending between the first finger joint and the fingertip point.

The use of a gradient enables to automatically locate the different geometrical characteristics of the captured finger.

The present invention also relates to a contactless acquired fingerprint image processor connected to at least a contactless fingerprint reader having various lighting conditions and adapted to acquire images of slap/fingers in a contactless position in vicinity of the reader under different lighting conditions for the acquisition of fingerprints of a user, said processor being adapted to segment slap images received from a contactless fingerprint reader under controlled lighting conditions and to generate accurately labelled individual fingerprints, said processor being adapted to compute a variance in the received images to estimate a slap area as a foreground slap mask in the input images, to identify individual fingers by finding boundary of each finger, to verify a number of fingers and of geometric constraints, to calculate pose and orientation based on shape and geometry information, identification of effective fingertip area on each detected finger according the pose, orientation, as well as geometric information, output of individual fingerprints.

Such a processor enables to implement the method of the invention to segment the slap images as received from a contactless fingerprint reader.

Advantageously, the processor is adapted to perform an adaptive binarization applied to an original lighted image with the foreground slap mask by calculating the dynamic range of both global and local dynamics according to the equation Thres(x,y)=α(x,y)+pα(x,y)β(x,y)−q), where α(x,y) is a local dynamic factor, β(x,y) is a global dynamic factor and p,q are pre-defined parameters, this adaptive binarization sub step outputting individual finger's masks.

Also advantageously, the processor is adapted to calculate pose and orientation based on shape and geometry information using a convexity check to detect fingertip points of the fingers.

According to a preferred embodiment, the processor is adapted to calculate pose and orientation based on shape and geometry information including a definition of a center line of each individual finger mask, a calculation of gradients along the direction of the finger centerline on the finger image, a detection of a first finger joint by finding perpendicular line with maximum gradient within certain distance to a fingertip point, a fingertip mask being defined by the area extending between the first finger joint and the fingertip point.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
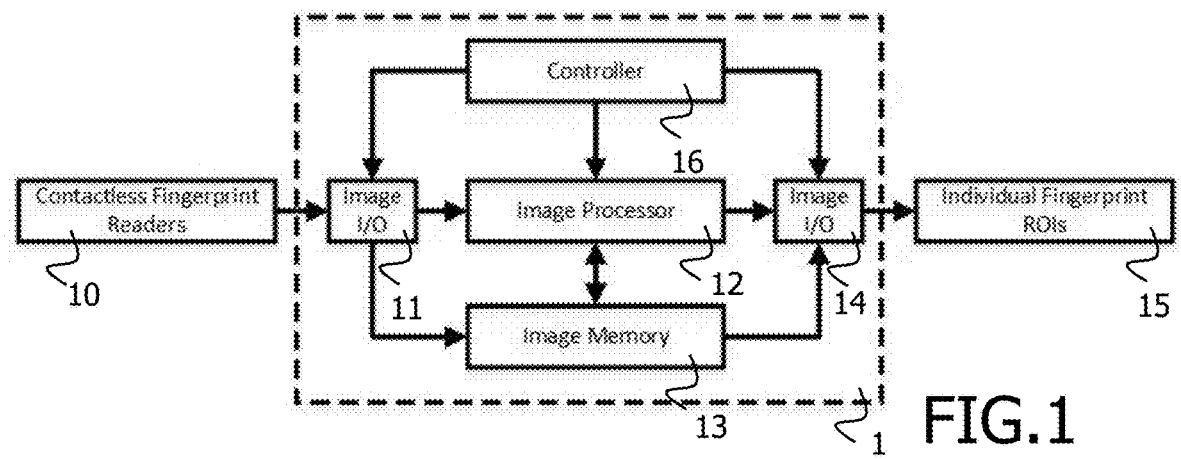
FIG. 1 represents schematic diagram of the contactless fingerprint segmentation system.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

The invention can be implemented using a software system or a hardware system. FIG. 1 is a schematic diagram of the proposed contactless fingerprint segmentation system 1 which comprises at least a controller 16, which include but not limited to the CPU, FPGA, DSP, or GPU. The controller manages all other modules, i.e., image I/O 11 and 14, processing by an image processor 12 and storage in an image memory 13.

The set of I/O ports 11 and 14 include but not limited to USB 2/3, Firewire, Thunderbolt, SATA, DMA, Ethernet, or Internet. These ports 11 and 14 take the input slap images from a contactless fingerprint reader 10, and send the output fingerprints 15 to other devices/systems.

The image processor 12 may be implemented by any programming languages, which include but not limited to C/C++, JAVA, Python, Assembly, or JavaScript. The image processor 12 or processing module identifies and extracts individual fingerprint ROIs 15 from slap images according to the invention.

Image memory 13 includes but is not limited to RAM, ROM, SSD, Hard drive, or NAS. The image memory 13 or storage module saves intermediate results and final output fingerprints.

Figure 2:
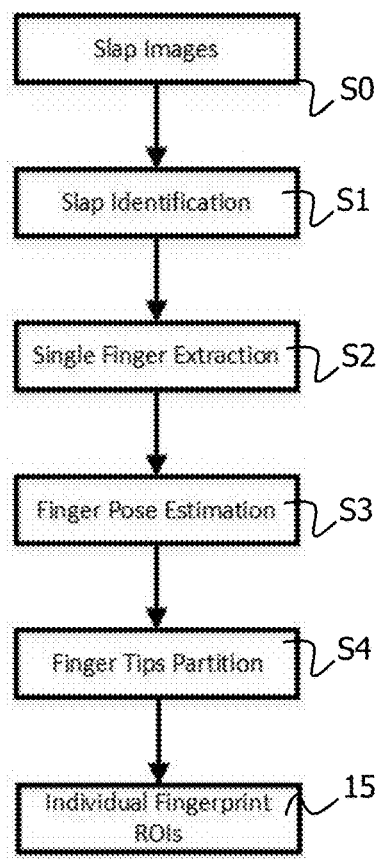
FIG. 2 shows flowchart illustrating the image processing work flow.

FIG. 2 is a flow chart illustrating the image processing work flow proposed in this invention, i.e., how to segment the slap images and generate individual fingerprint ROIs that are labelled accurately. In a first step S0, slap images are received from a contactless fingerprint reader 10 under controlled lighting conditions. Slap area in the input images is initially estimated as a foreground slap mask by computing a variance in the received images in a step S1. Then, in a step S2, individual fingers are identified by finding boundary of each finger, meanwhile number of fingers and geometric constraints are verified. In next step S3, for each finger, pose and orientation are calculated based on the shape and geometry information. In a step S4, effective fingertip area is identified on each detected finger according the pose, orientation, as well as geometric information. Individual fingerprint ROI 15 are then output. The fingertip area is described as a rotated rectangle ROI, both the segmented fingerprint images and the coordinates of the rectangle ROIs are then saved to the storage or sent to other systems.

Figure 3:
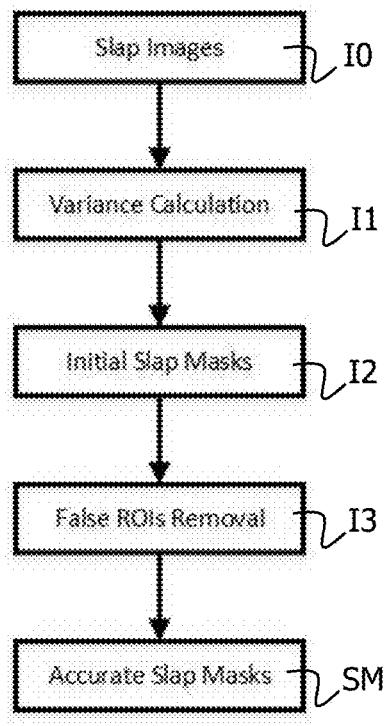
FIG. 3 shows a flowchart illustrating the foreground slap mask estimation.

FIG. 3 is a flowchart illustrating a process for slap/foreground area identification as described in the step S1 in FIG. 2. The contactless fingerprint reader captures slap images under controlled lighting conditions, e.g., using the flash light, in a step 10. Under certain lighting condition, the foreground slap area would show larger lighting variance in different images compared with the background area. Based on these findings, variance is calculated in a step 11 in the images and set up an adaptive threshold for different image area.

Figure 4:
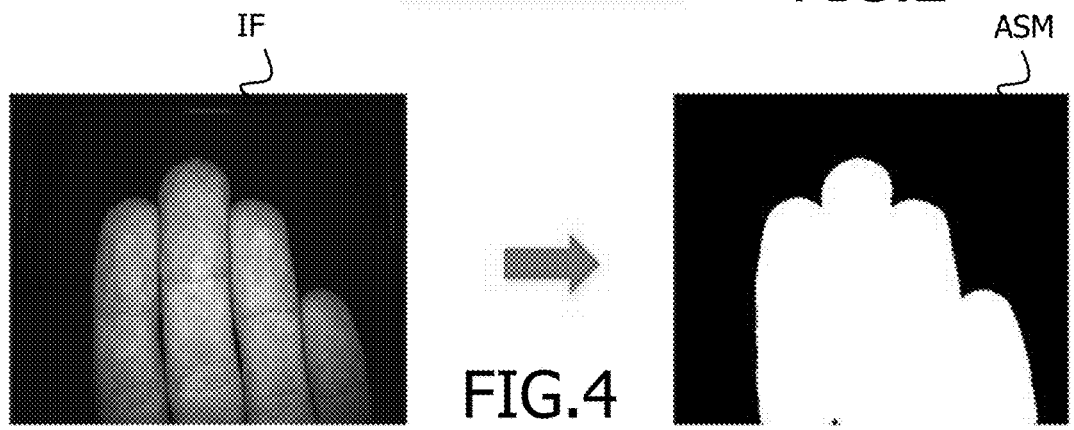
FIG. 4 shows an example of the foreground mask estimation.

Then, pixels having a variance larger than the threshold as the foreground slap area, and other pixels as the background area. The pixel value M(x,y) of the slap mask can be determined by the following equation:

$$M(x, y) = \begin{cases} 255 & \text{if } T(x, y) \geq I_D(x, y) \\ 0 & \text{if } T(x, y) < I_D(x, y) \end{cases},$$

where $I_D(x,y)$ is the pixel variance, and the $T(x,y)$ is the adaptive threshold for the pixel (x, y). An initial slap mask of the foreground slap area in thus obtained in a step I2. However, the initial slap mask may contain a lot of false estimation due to the uneven lighting condition and the noisy background. Therefore, morphology operations are applied in a step I3. It comprises opening and closing to fill holes and remove false noisy area on the initial mask in order to obtain an accurate slap area mask SM as shown in FIG. 4 as extracted from the slap image IF with flash on.

Figure 5:
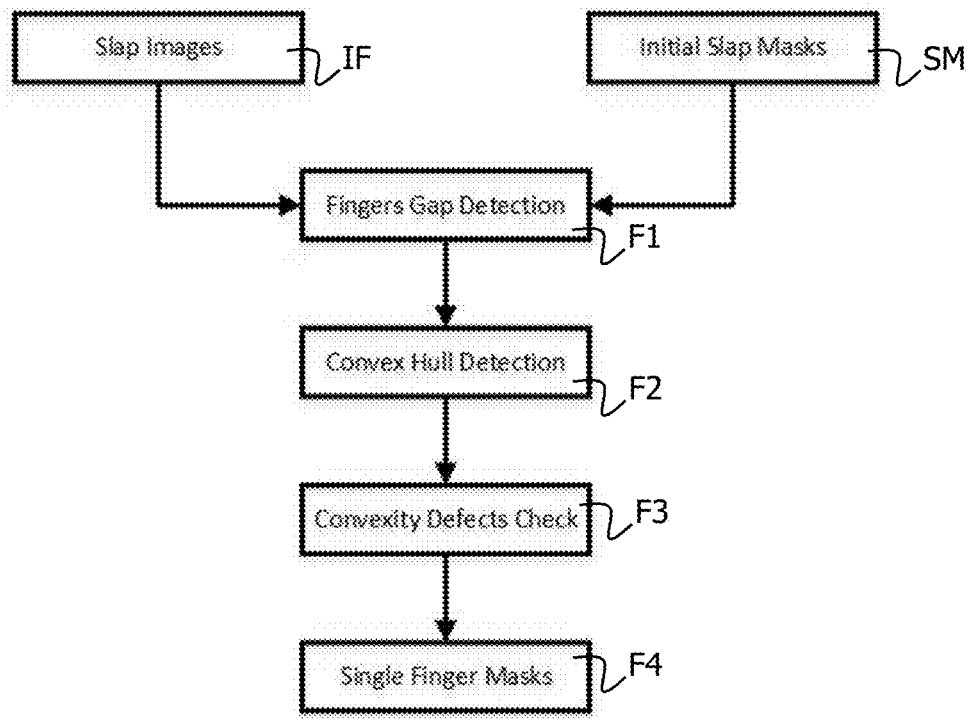
FIG. 5 shows a flowchart illustrating individual finger identification.

FIG. 5 is a flowchart illustrating the process for single finger identification. As one of the advantages of the contactless fingerprint reader 10, the slap can be placed over the reader without any physical touch to the device, which helps to improve the slap image acquisition speed and convenience. However, as the side effects, the contactless fingerprint reader 10 provides much less constraint on the position of the fingers for image acquisition. So that, the fingers may rotate, tilt, or bend at the time of capture, and moreover, the fingers may be adjacent to each other very closely in a 4-finger slap image.

As a result, the traditional slap segmentation methods, which assume fingers are well separated, would fail in most of the cases in contactless fingerprint systems. Therefore, the most challenging part to identify effective fingerprint ROIs is to identify each individual fingerprint.

The single finger identification method of the invention includes a first step where two images are received, one is the original image IF, the other is the foreground mask SM that is obtained as described on FIG. 3.

Figure 6:
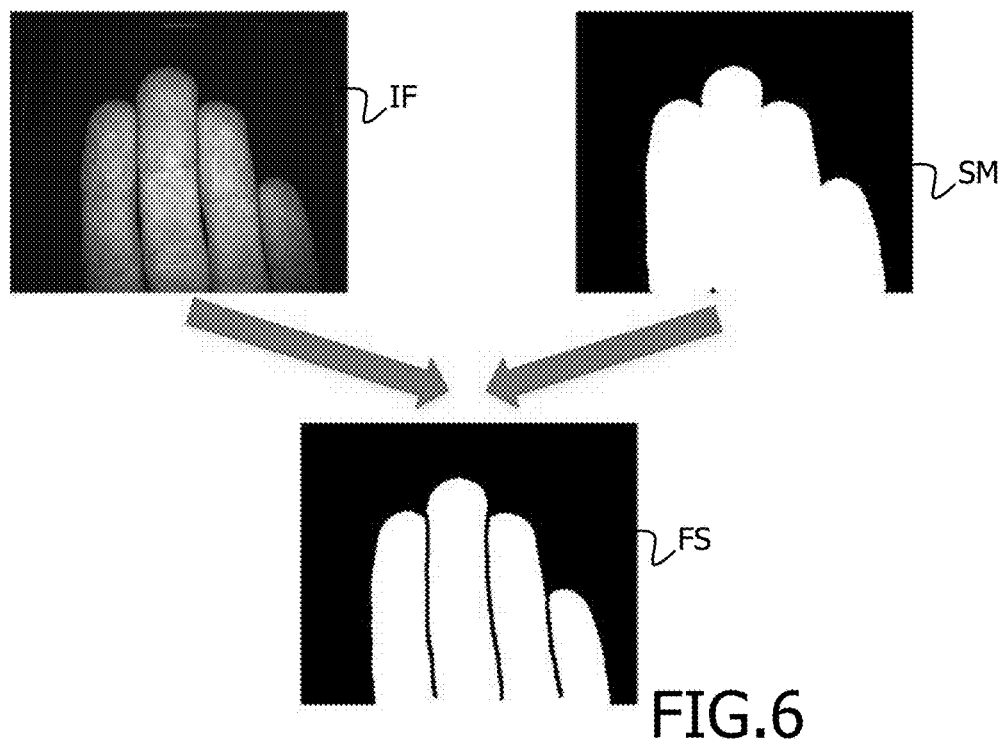
FIG. 6 illustrates a finger gap identification.

FIG. 6 shows, on the bottom image FS, the gaps between fingers that need to be determined from the two images, especially when the fingers are adjacent to each other.

In a first step F1, an adaptive binarization method is applied to the original image IF with the foreground mask as the constraints. In this method, the thresholds for the binarization are determined by calculating the dynamic range of both the global and the local dynamics as shown in the following equation $\text{Thres}(x,y) = \alpha(x,y) + p\alpha(x,y)\beta(x,y) - q$, where $\alpha(x,y)$ is a local dynamic factor for each pixel (x,y), i.e., the mean value inside the sliding window centered with the pixel (x,y), x and y are the coordinates of the pixel. $\beta(x,y)$ is a global dynamic factor that is calculated based on the variation of the whole image, p and q are constant positive values, where p equals to the maximum standard deviation of an image, i.e., 128 for 8 bit grayscale images, and q equals to a pre-set bias in the range of [0.1, 0.6] depending on different applications. This binarization enables to define lines separating the fingers as shown on the bottom image FS of FIG. 6.

Figure 7:
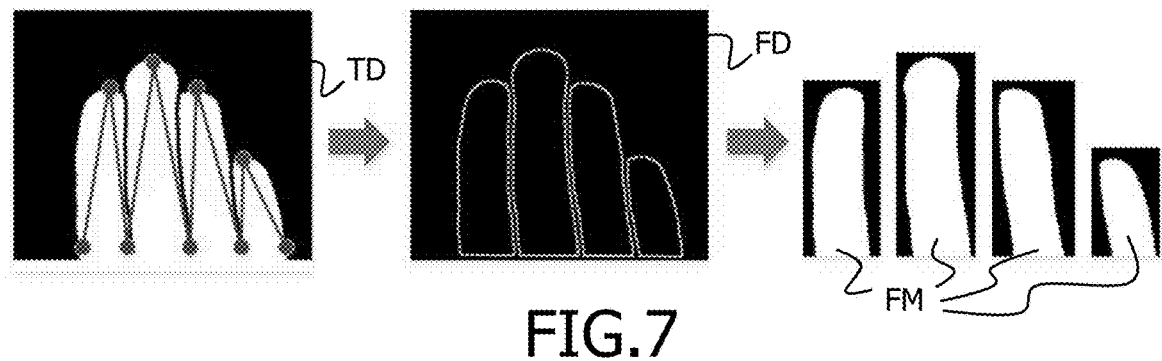
FIG. 7 illustrates an individual finger identification.

Then, as illustrated in FIG. 7, in order to identify each individual finger, the convex hull that enclose the whole slap is firstly found in a step F2, which helps detect tips of the fingers. Then, in a step F3, convexity is checked inside the convex hull in order to find the base/joint of the fingers. Normally, the convexity defects, i.e., the area that does not belong to the slap but located inside of convex hull, are first calculated. In this case, it refers to the area between two fingers, and the area on the two sides of the slap. So, the points in convex defects with maximum distance to the corresponding edge of convex hull, i.e., base/joint of the fingers, are detected as illustrated by image TD. At last, each individual fingers are finally identified by combining the position of the finger tips and the finger base as illustrated by image FD and corresponding masks FM are generated for each of them in a step F4.

After each individual finger is identified at step F4, an accurate detection of the position of fingertips is needed.

Figure 8:
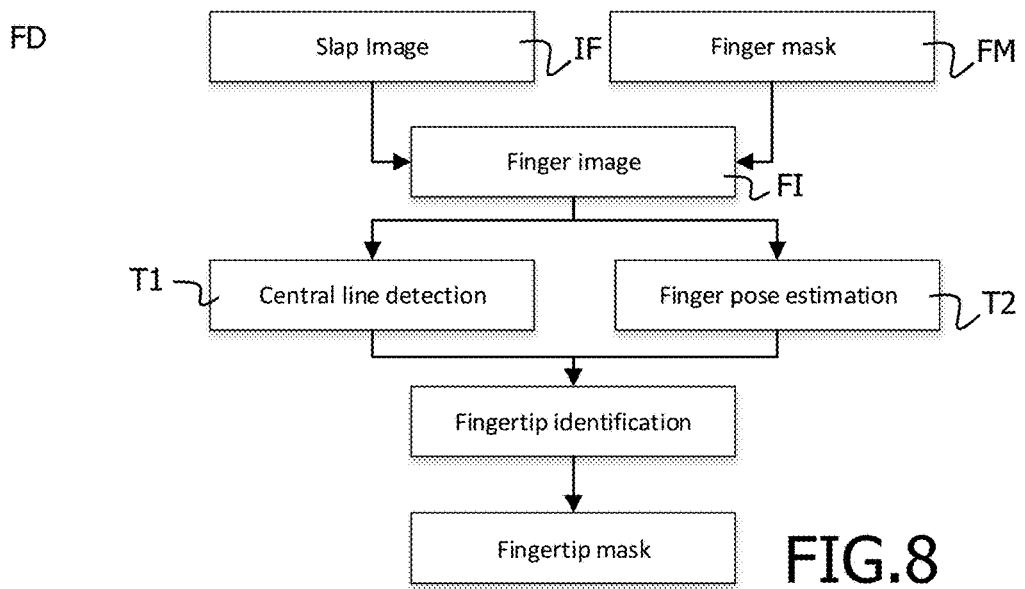
FIG. 8 shows a flowchart illustrating the fingerprint pose estimation & fingertip identification.
Figure 9:
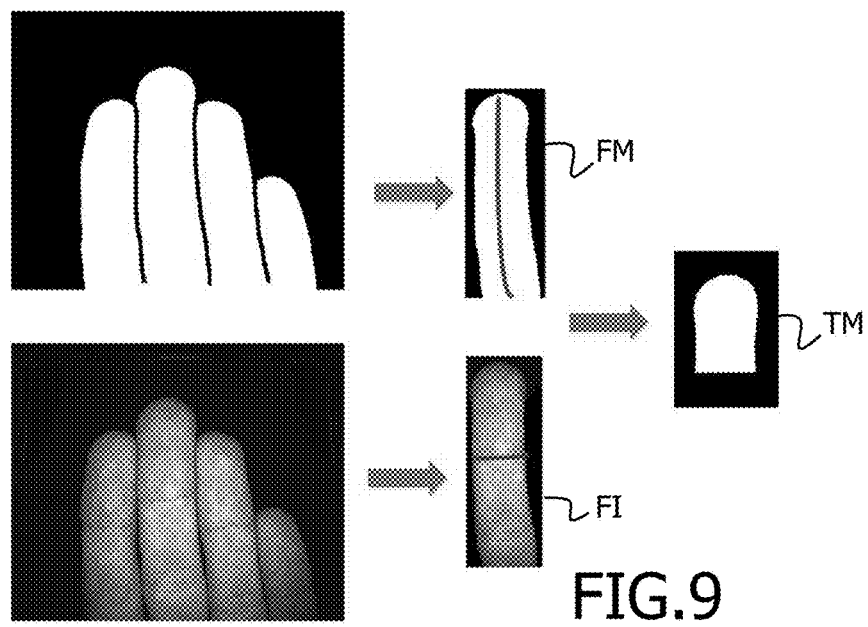
FIG. 9 illustrates an individual fingertip identification.

FIG. 8 is the flowchart illustrating the process according to the invention for finger pose estimation and fingertip segmentation. FIG. 9 illustrates the pose estimation and fingertip identification.

The finger pose is estimated by finding the center line of the finger mask in a step T1 as schematically illustrated on FIG. 9 on the individual finger mask. In some special cases where the fingers are not straight, the average angle of the center line is estimated.

Based on the results of step T1, gradients along the direction of the finger centerline are calculated on the finger image FI, then the first finger joint can be detected by finding perpendicular line with maximum gradient within certain distance to the fingertip point in a step T2 of finger pose estimation. It enables to determine fingertips masks TM.

Figure 10:
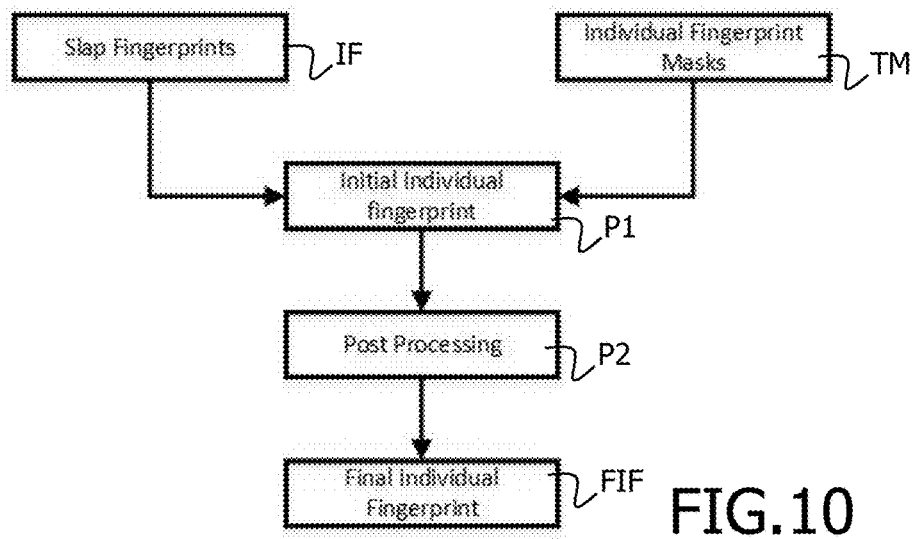
FIG. 10 shows a flowchart illustrating the final fingerprint generation process.

FIG. 10 is the flowchart illustrating the process for generating the final individual fingerprint images.

Input images are received in a first step P1, one is the slap fingerprint image IF, and the other is a set of individual fingertip masks TM, and individual fingerprint images are generated by combining the slap image IF and the fingertip masks TM.

Figure 11:
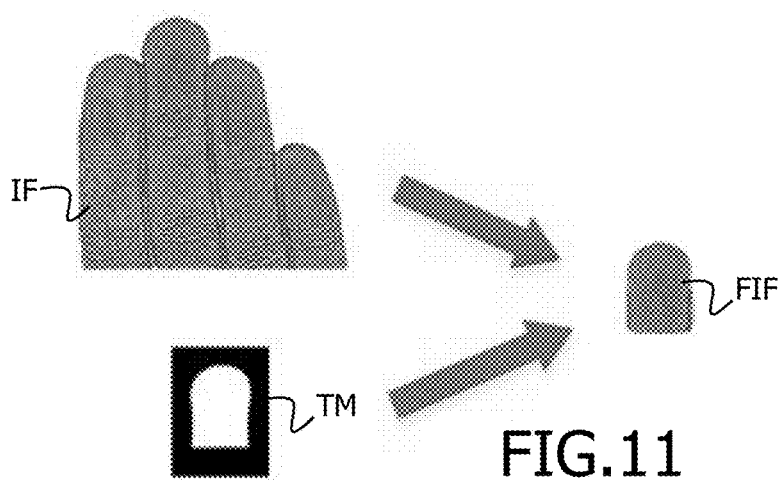
FIG. 11 shows an example of final individual fingerprint segmentation.

In a step P2, post processing is performed including at least image smoothing and denoising operations applied to the individual fingerprint images in order to remove the random noise. Advantageously further morphological transformations are applied to the obtained fingerprint images to remove the structural noise and smooth the edge of the fingerprint. Then the final individual fingerprint FIF are generated as also shown on FIG. 11.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to segment slap images and to generate accurately labelled individual fingerprints, said method comprising the following steps:
    reception of inputs images from a contactless fingerprint reader under controlled lighting conditions;
    computation of a variance in the received images to estimate a slap area as a foreground slap mask in the input images;
    identification of individual fingers by finding boundary of each finger by an adaptive binarization sub step applied to an original lighted image with the foreground slap mask by calculating the dynamic range of both global and local dynamics according to the equation Thres(x,y)=$\alpha$(x,y)+p$\alpha$(x,y)($\beta$(x,y)−q), where $\alpha$(x,y) is a local dynamic factor, $\beta$(x,y) is a global dynamic factor and p,q are pre-defined parameters, this adaptive binarization sub step outputting individual finger's masks;
    verification of a number of fingers and of geometric constraints;
    calculation of pose and orientation based on shape and geometry information;
    identification of effective fingertip area on each detected finger according the pose, orientation, as well as geometric information;
    output of individual fingerprints.

2. The method to segment slap images according to claim 1, wherein the images acquired under controlled lighting conditions are images acquired with and without flash light.

3. The method to segment slap images according to claim 1, wherein the step of calculation of pose and orientation based on shape and geometry information comprises a convexity check to detect fingertip points of the fingers.

4. The method to segment slap images according to claim 1, wherein the step of calculation of pose and orientation based on shape and geometry information comprises a sub step of defining a center line of each individual finger mask, a sub step of calculating gradients along the direction of the finger centerline on the finger image, a sub step of detection of a first finger joint by finding perpendicular line with maximum gradient within certain distance to a fingertip point, a fingertip mask being defined by the area extending between the first finger joint and the fingertip point.

5. A contactless acquired fingerprint image processor connected to at least a contactless fingerprint reader having various lighting conditions and adapted to acquire images of slap/fingers in a contactless position in vicinity of the reader under different lighting conditions for the acquisition of fingerprints of a user, said processor being adapted to segment slap images received from a contactless fingerprint reader under controlled lighting conditions and to generate accurately labelled individual fingerprints, said processor being adapted to compute a variance in the received images to estimate a slap area as a foreground slap mask in the input images, to identify individual fingers by finding boundary of each finger by being adapted to perform an adaptive binarization applied to an original lighted image with the foreground slap mask by calculating the dynamic range of both global and local dynamics according to the equation Thres (x,y)=$\alpha$(x,y)+p$\alpha$(x,y)($\beta$(x,y)−q), where $\alpha$(x,y) is a local dynamic factor, $\beta$(x,y) is a global dynamic factor and p, q are pre-defined parameters, this adaptive binarization sub step outputting individual finger's masks, to verify a number of fingers and of geometric constraints, to calculate pose and orientation based on shape and geometry information, identification of effective fingertip area on each detected finger according the pose, orientation, as well as geometric information, output of individual fingerprints.

6. The contactless acquired fingerprint image processor according to claim 5, said processor being adapted to calculate pose and orientation based on shape and geometry information using a convexity check to detect fingertip points of the fingers.

7. The contactless acquired fingerprint image processor according to claim 5, said processor being adapted to calculate pose and orientation based on shape and geometry information including a definition of a center line of each individual finger mask, a calculation of gradients along the direction of the finger centerline on the finger image, a detection of a first finger joint by finding perpendicular line with maximum gradient within certain distance to a fingertip point, a fingertip mask being defined by the area extending between the first finger joint and the fingertip point.

* * * * *